A. J. Nave,

Washing Machine.

No. 111,374. Patented Jan. 31, 1871.

Witnesses:
Gustave Dieterich
G. S. Mabee

Inventor:
A. J. Nave
per Munn & Co.
Attorneys.

United States Patent Office.

ANDREW JACKSON NAVE, OF COLUMBUS, TEXAS.

Letters Patent No. 111,374, dated January 31, 1871.

IMPROVEMENT IN WASHING-MACHINES.

The Schedule referred to in these Letters Patent and making part of the same.

*To all whom it may concern:*

Be it known that I, ANDREW JACKSON NAVE, of Columbus, in the county of Colorado and State of Texas, have invented a new and useful Improvement in Washing-Machine; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
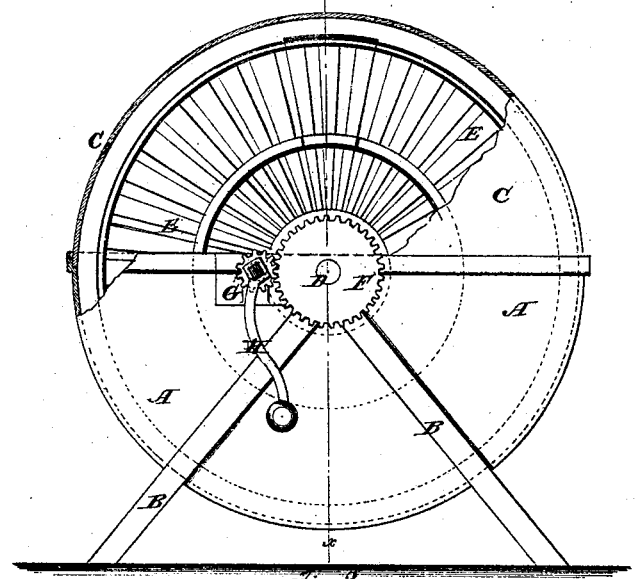
Figure 1 is a side view of my improved machine, part being broken away to show the construction.
Figure 2:
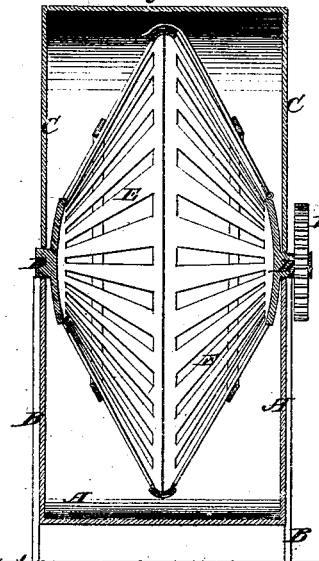
Figure 2 is a detail vertical section of the same, taken through the line $x\,x$, fig. 1.

My invention has for its object to furnish an improved machine for washing wool, clothes, &c., which shall be simple in construction, convenient in use, and effective in operation, being so constructed as to wash the clothes quickly, thoroughly, and with very little wear; and It consists in the construction and combination of various parts of the machine, as hereinafter more fully described.

A is the box or tub of the machine, which is made in the form of a short semi-cylinder, and is set upon legs B, of such a length as to raise the machine to a convenient height.

The box A is provided with a cover, C, which is also made in the form of a short semi-cylinder, so that when the cover C is placed upon the box A the machine has the form of a short cylinder.

In bearings in the upper edge of the box A revolve the journals D, which are attached to a wheel or cage, E, which is made in the form of two oblate, short, or flattened cones, placed base to base, and secured to each other.

The body or sides of the cage E are formed of radial strips, the inner or converging ends of which are attached to circular plates, to which are secured the journals D, and the other or diverging ends of which strips are attached to a ring-plate, which thus unites the two cones or parts of the cage.

The middle parts of the radial strips which form the sides of the cage are strengthened or held in their proper relative positions by narrow ring-plates, to which the said strips are attached.

A portion of one side of the cage E is made detachable, to serve as a door for the insertion and removal of the articles to be washed.

This door may be hinged at its narrow end, and provided with a spring-catch at its other end for convenience in operating it.

To the projecting end of one of the journals D is attached a large gear-wheel, F, into the teeth of which mesh the teeth of the small gear-wheel G, which is pivoted to the side of the box A, and with which is connected the crank H by which the machine is operated.

In using the machine the clothes or other articles to be washed are placed in the cage E, which is then revolved.

The weight of the clothes forces them into the narrow parts of the cavity of the said cage as the said cage is revolved, washing the clothes clean in a very short time.

If desired, balls may be placed in the cage E, with the articles to be washed, which will enable the said articles to be washed more quickly.

Having thus described my invention,

I claim as new and desire to secure by Letters Patent—

The double cone-shaped wheel or cage E, constructed substantially as herein shown and described, in combination with the journals D, gear-wheels F G, crank H, box A, and cover B, as and for the purpose set forth.

ANDREW JACKSON NAVE.

Witnesses:
M. J. CONNELLY,
J. N. BINKLEY.